United States Patent
Ritter et al.

(10) Patent No.: US 9,396,446 B2
(45) Date of Patent: Jul. 19, 2016

(54) MODELING PROPERTIES OF DATA AND EVENTS AS TRANSFORMATIONS OF DOCUMENT DATA AND SYSTEM VALUES

(75) Inventors: Gerd Ritter, Heidelberg (DE); Rene Gross, Heidelberg (DE); Tim Kornmann, Wiesloch (DE); Steffen Tatzel, Nussloc (DE); Dirk Stumpf, Graben-Neudorf (DE); Dirk Giebel, Walldorf (DE)

(73) Assignee: SAP SE, Walldorf (DE)

( * ) Notice: Subject to any disclaimer, the term of this patent is extended or adjusted under 35 U.S.C. 154(b) by 652 days.

(21) Appl. No.: 13/284,020

(22) Filed: Oct. 28, 2011

(65) Prior Publication Data
US 2013/0111381 A1    May 2, 2013

(51) Int. Cl.
G06F 3/048      (2013.01)
G06Q 10/06    (2012.01)
G06Q 10/10    (2012.01)

(52) U.S. Cl.
CPC ............... *G06Q 10/06* (2013.01); *G06Q 10/10* (2013.01)

(58) Field of Classification Search
USPC ........................................................ 715/765
See application file for complete search history.

(56) References Cited

U.S. PATENT DOCUMENTS

| | | | |
|---|---|---|---|
| 7,913,223 B2* | 3/2011 | Taber, III | 715/765 |
| 2006/0085336 A1* | 4/2006 | Seubert et al. | 705/40 |
| 2012/0216137 A1* | 8/2012 | Aman et al. | 715/765 |
| 2013/0174181 A1* | 7/2013 | Jentsch | G06F 9/4443 719/328 |

* cited by examiner

*Primary Examiner* — Dino Kujundzic
(74) *Attorney, Agent, or Firm* — Mintz Levin Cohn Ferris Glovsky and Popeo, P.C.

(57) ABSTRACT

A system and method for modeling properties of data and events of a business application is presented. The system include a user interface frontend system that displays a user interface, and a user interface backend system that hosts a business application that generates the user interface for display in the user interface frontend system. The system further includes an enterprise service framework comprising one or more data processors that define one or more properties of data and/or events related to the business application, and model each of the one or more properties as a data field of the business application. A dynamic properties calculator includes one or more data processors that access a set of transformation logic representing data transformation rules for each of the data fields of the business application, and apply the transformation rules to the data fields that represent the one or more properties.

15 Claims, 6 Drawing Sheets

Sales Order: 311

Status: In Preparation  Account: Silverstar Wholesale Corp  External Reference:  Employee Responsible: Kate Jacob  Net Value w/o Freight: 300,85 USD  Total: 346.51 USD Submit ▾ | Save | Close | Preview | New ▾ | Copy | Follow-Up ▾ | Create Project

Release Order
Send Order Confirmation to Account
Release to Service Execution
Confirm Service Execution
Complete Service Execution

— 220

Contact
Name: Frank Sent
Phone: +1 (518) 482-8246
E-Mail: frank.sent@silverstar-wholesale.us
Address Details New ▾

Address Details

General
Status: In Preparation
Description:
External Reference:
Posting Date: 11.02.2011
Requested Date: 12.02.2011

Show Ship-To/Bill-To: ☐

Campaign Name:
Marketing Costs:

Organizational Assignment
Employee Responsible: Kate Jacob
Sales Unit: GROUP Wholesales New York
Sales Organization: Region North East Coast US
Distribution Channel: Direct sales

| SAP Business ByDesign | | | | | | | Kate Jacob \| Personalize \| Adapt \| He |
|---|---|---|---|---|---|---|---|
| Home | Business Analytics | Application and User Management | Marketing | Account Management | New Business | Sales Orders ▼ | Customer Invoicing | Service Orders | Product Data | Product Service ‹ › |

Sales Orders

Show [My Open Orders ▼] [____] [Go]   ◊ Advanced

Group By [None ▼] [Edit] [New▼] [Export▼] [Copy] [Delete] [Follow-Up▼] [Confirm Execution] [Actions▼]

| Status | Sales Order ID | External Reference | Account | Posting D... | | Total |
|---|---|---|---|---|---|---|
| Open | 296 | | Silverstar Wholesale Corp | 27.05.20 | Set Delivery Block | 994,10 USD |
| Open | 293 | | Silverstar Wholesale Corp | 27.05.20 | Remove Delivery Block | 994,10 USD |
| Open | 292 | | Silverstar Wholesale Corp | | Set Invoice Block | 5,237,34 USD |
| Open | 290 | | Silverstar Wholesale Corp | 27.05.2011 | Remove Invoice Block | 994,10 USD |
| Open | 288 | | Silverstar Wholesale Corp | 27.05.2011 | 28.05.2011 | 5,237,34 USD |
| Open | 287 | | Silverstar Wholesale Corp | 27.05.2011 | 28.05.2011 | 994,10 USD |
| Open | 285 | | Silverstar Wholesale Corp | 27.05.2011 | 28.05.2011 | 5,237,34 USD |
| Open | 284 | | Silverstar Wholesale Corp | 27.05.2011 | 28.05.2011 | 3,249,14 USD |
| Open | 279 | | Silverstar Wholesale Corp | 27.05.2011 | 28.05.2011 | 3,249,14 USD |
| | | | | | | 994,10 USD |

Details: Sales Order 292

[General] [Items]

Account                                    Contact

MODELING PROPERTIES OF DATA AND EVENTS AS TRANSFORMATIONS OF DOCUMENT DATA AND SYSTEM VALUES

BACKGROUND

This disclosure relates generally to computing systems, and more particularly to modeling properties of data and events of a computing system as transformations of document data and system values.

Properties of data and events are widely used particularly in UI applications. Properties have the main purpose to hide or modify the exposure of services the user cannot execute or shall not see, that is, they also guide the user (usability). Conventionally, properties of data and properties of events are handled as separate entities in user interfaces compared to the data attributes themselves. The communication channel to the user interface framework is also separated. There is a separate and dedicated communication channel and method to access dynamic properties, which are those properties that are not fixed for the respective data value or event, but depend on data (for example, a country associated with a sales order), user or system fields (such as a current date). Dynamic properties are computed by separate services within the business object services. Therefore, the logic as to how the dynamic properties are computed is hidden to the user interface frameworks.

This conventional approach has a number of drawbacks. First, it is not possible to easily shift a property calculation from one framework/execution layer to another. For example, if the data is supposed to be retrieved directly from an in-memory computing system database or a text-based search engine instead of from the business object (BO) service provider, then still the BO service provider must be invoked to compute the properties. This nullifies performance benefits of retrieving data directly from the in-memory database. The additional access of the BO service provider that is required basically offsets the new capabilities of the strictly in-memory approach.

Since easy shifting is not supported, it is also not possible to automatically provide a kind of "load balancing," i.e. shifting the property calculation to the layer, where it is best suited for the current use case. The dependency between properties and data, user settings, or system fields is not transparent. This means also that a "where-used" list of the properties is not possible. The lack of transparency of these dependencies and how the properties are calculated hinders central framework optimization to can improve performance, supportability, maintenance costs, and/or operating costs.

SUMMARY

In general, this document discloses systems and methods for modeling properties of data and events as transformations of document data and system values.

Properties are no longer handled as separate entities, but rather as usual data fields or even indicators. For example, for a data field "ProductIdentifier" on the user interface (UI), three additional data fields are introduced "ProductIdentifierReadOnly", "ProductIdentifierMandatory", and "ProductIdentifierEnabled". The same holds for an event button such as "Release", where a data field "ReleaseEnabled" is automatically added. Those data fields are automatically tagged by the framework, so that the relationships can be evaluated by the UI framework.

Modeling the properties as data fields allows use of the transformation logic (transformation rules) available for data fields in a controller infrastructure. That is, reusable transformation rules can be used by the UI developer to adjust or fix the property calculation based on the data of the business documents, user settings, and system fields. By binding the transformation rules to data and system fields, dependencies of the properties also become transparent (such as for generating a "where-used" list).

In one aspect, a computer-implemented method includes the steps of defining, using one or more data processors of a user interface framework, one or more properties of data and/or events related to a business application of the user interface framework, and modeling, using the one or more data processors, each of the one or more properties as a data field of the business application. The method further includes the steps of accessing, by the one or more data processors from a controller infrastructure of the user interface framework, a set of transformation logic representing data transformation rules for each of the data fields of the business application. The method further includes the step of applying, by the one or more data processors, the transformation rules to the data fields of the business application in response to a request by the user interface framework, the transformation rules being applied to the data fields that represent the one or more properties.

In another aspect, a system for modeling properties of data and events of a business application is presented. The system includes a user interface frontend system that displays a user interface, and a user interface backend system that hosts a business application that generates the user interface for display in the user interface frontend system. The system further includes an enterprise service framework comprising one or more data processors that define one or more properties of data and/or events related to the business application, and model each of the one or more properties as a data field of the business application. The system further includes a dynamic properties calculator comprising one or more data processors that access a set of transformation logic representing data transformation rules for each of the data fields of the business application, and apply the transformation rules to the data fields that represent the one or more properties.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

DETAILED DESCRIPTION

This document describes systems and methods for modeling properties of data and events as transformations of document data and system values. In accordance with preferred implementations, properties are no longer handled as separate entities, but rather as usual data fields or even indicators. Prominent examples of properties used on user interfaces are:

1) For data values (#UI fields#)
   a) Read-only: shall the field be ready for user input or read-only?
   b) Mandatory: must the user provide a (valid) input on the field?
   c) Enabled: is the field visible or not? This is, for example, used by globalization to enable or disable fields, which are only relevant in some countries
2) For UI events (typically buttons or links on the user interface):
   a) Enabled: is the button or the link enabled or not? For example, a release operation on a sales order shall be only enabled once the document is error free.

For example, for a data field "ProductIdentifier" on the user interface (UI), three additional data fields are introduced: "ProductIdentifierReadOnly", "ProductIdentifierMandatory", and "ProductIdentifierEnabled". The same holds for an event button such as "Release", where a data field "ReleaseEnabled" is automatically added. Those data fields are automatically tagged by the framework, so that the relationships can be evaluated by the UI framework.

Turning first to FIGS. 3A-D, there are shown various example UI floorplans to illustrate effects of various implementations of the system and method described herein. As shown in a sales order UI 202 in FIG. 3A, some actions 200 of a UI event are enabled, while others are not, depending on data and status of the documents selected. In an alternative sales order UI 202 shown in FIG. 3B, a data value 222 "Account" is designated as having a property of mandatory, as designated in this example by an asterisk. The designation can depend on document data or system configuration. For example, if a contact is not mandatory, that contact may show without an asterisk. A field 224 is editable, i.e. not read-only, but will no longer be editable depending on a status and data of the document represented by the field.

Figure 3A:
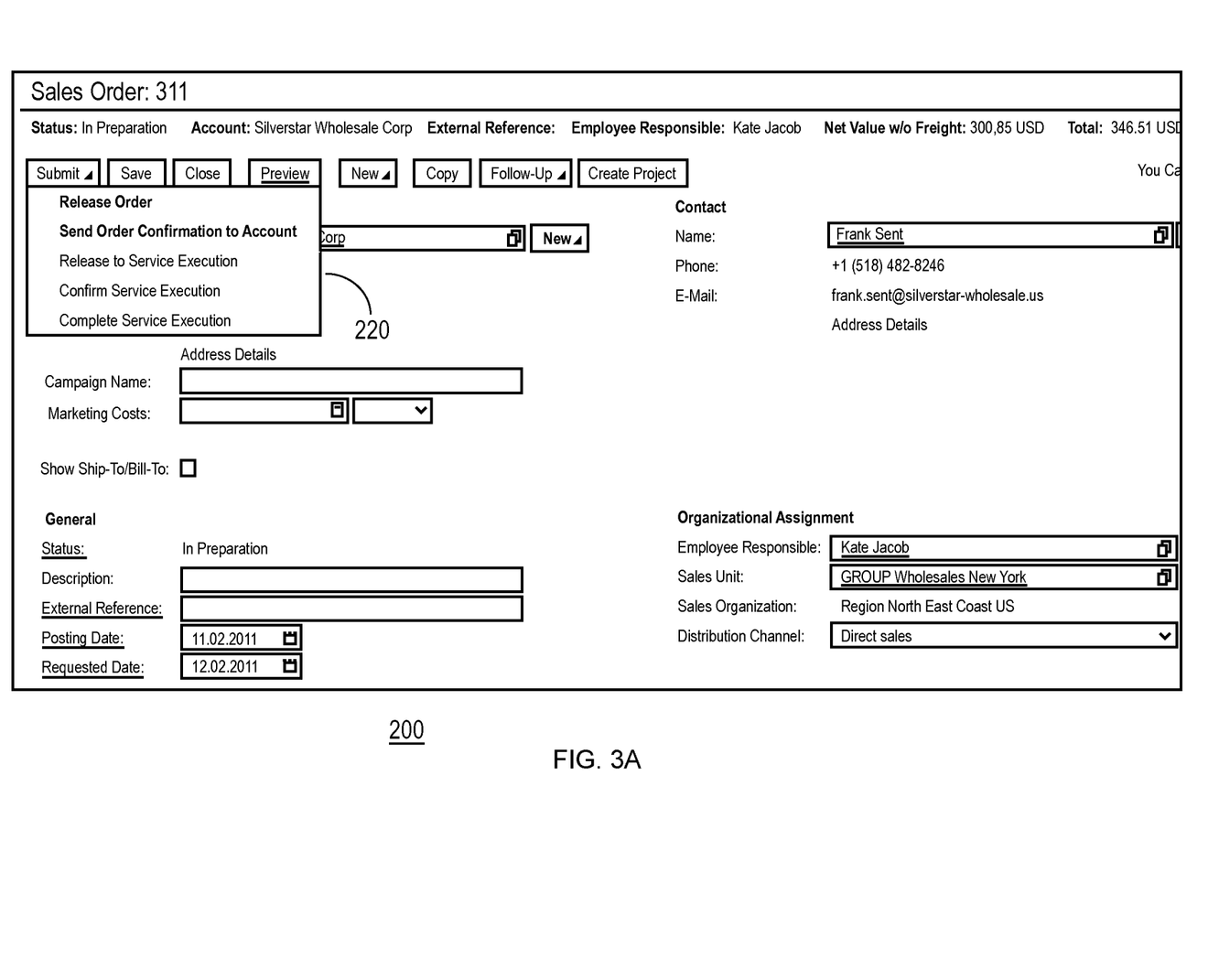
FIGS. 3A-D show various example UI floorplans to illustrate effects of various implementations of the system and method described herein Like reference symbols in the various drawings indicate like elements.
Figure 3B:
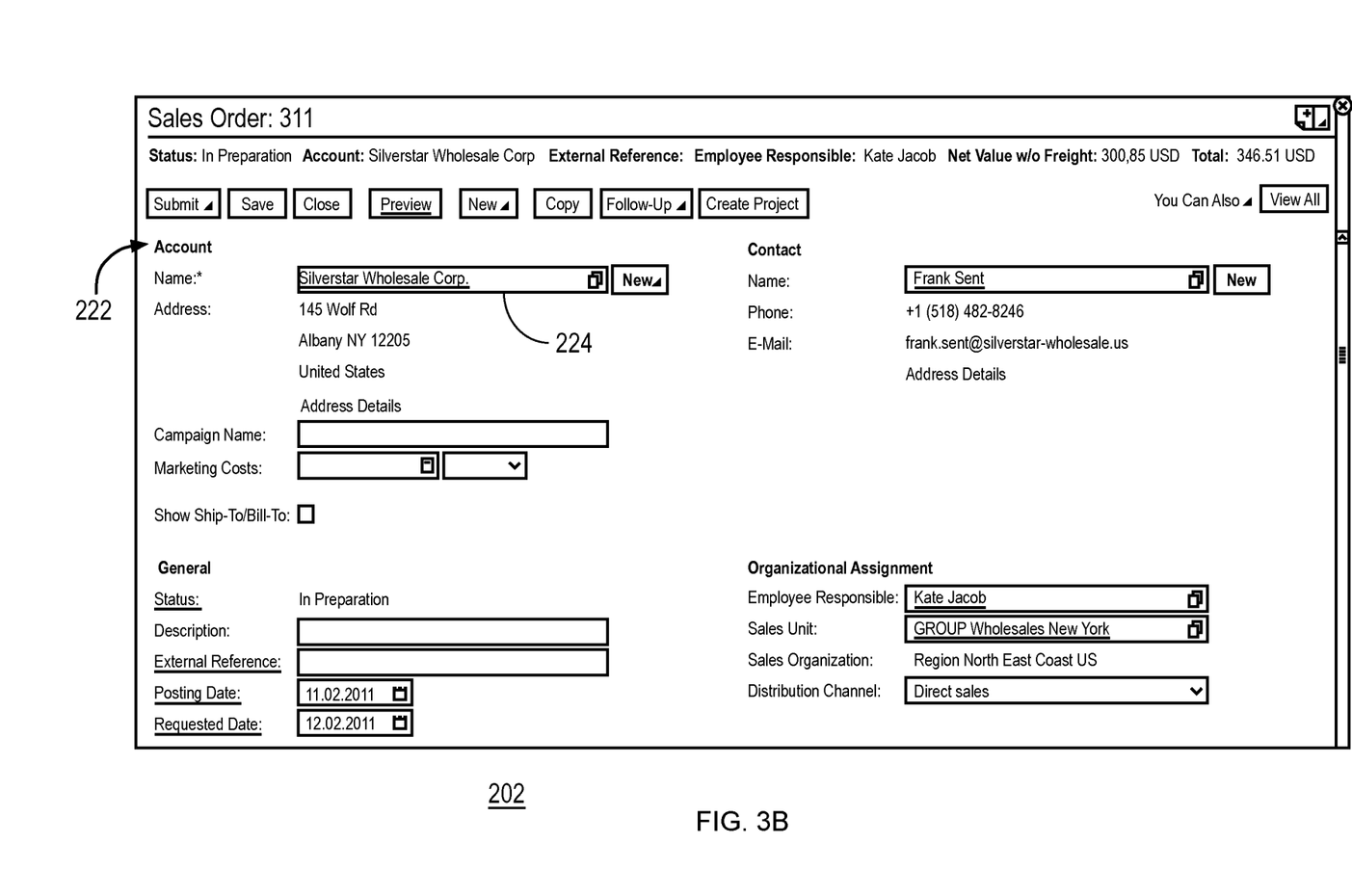
Figure 3C:
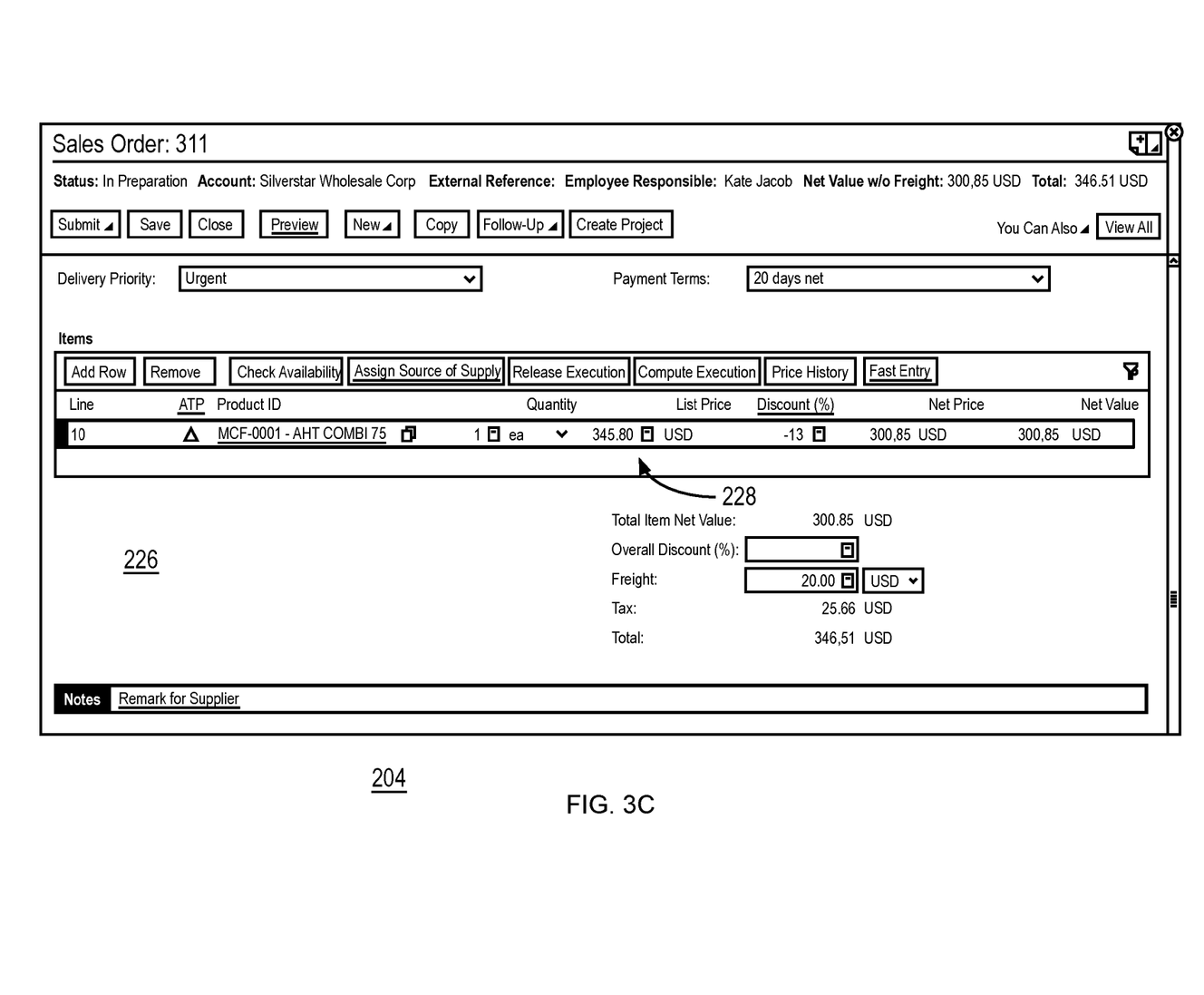
Figure 3D:
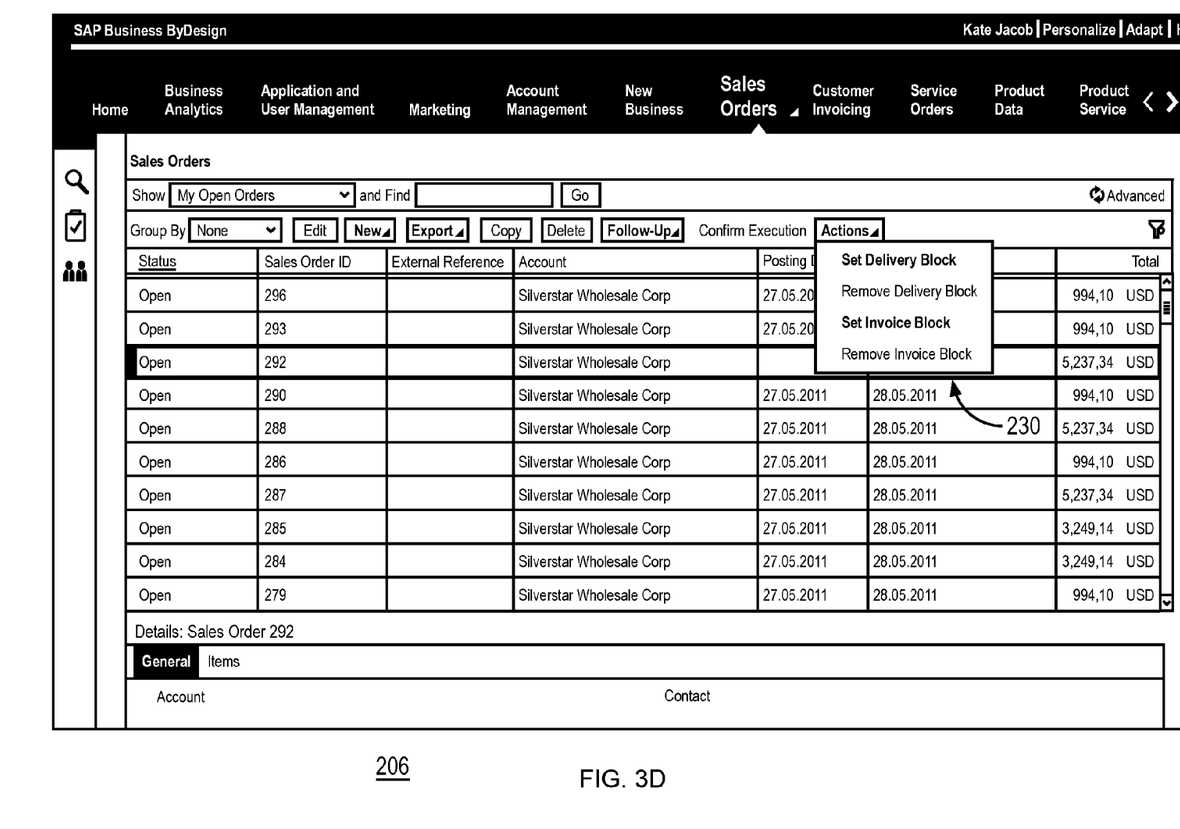

FIG. 3C shows yet another example of a sales order UI 204 in which some fields 226 from globalization, i.e., for example fields for a specific country, can be designated as not enabled if the sales order relates to a different country. Other fields 228 can be designated as "read-only." FIG. 3D shows an object work list UI 206 in which some actions 230 of a UI event are enabled, while others are not, again depending on data and status of the documents selected.

Figure 1:
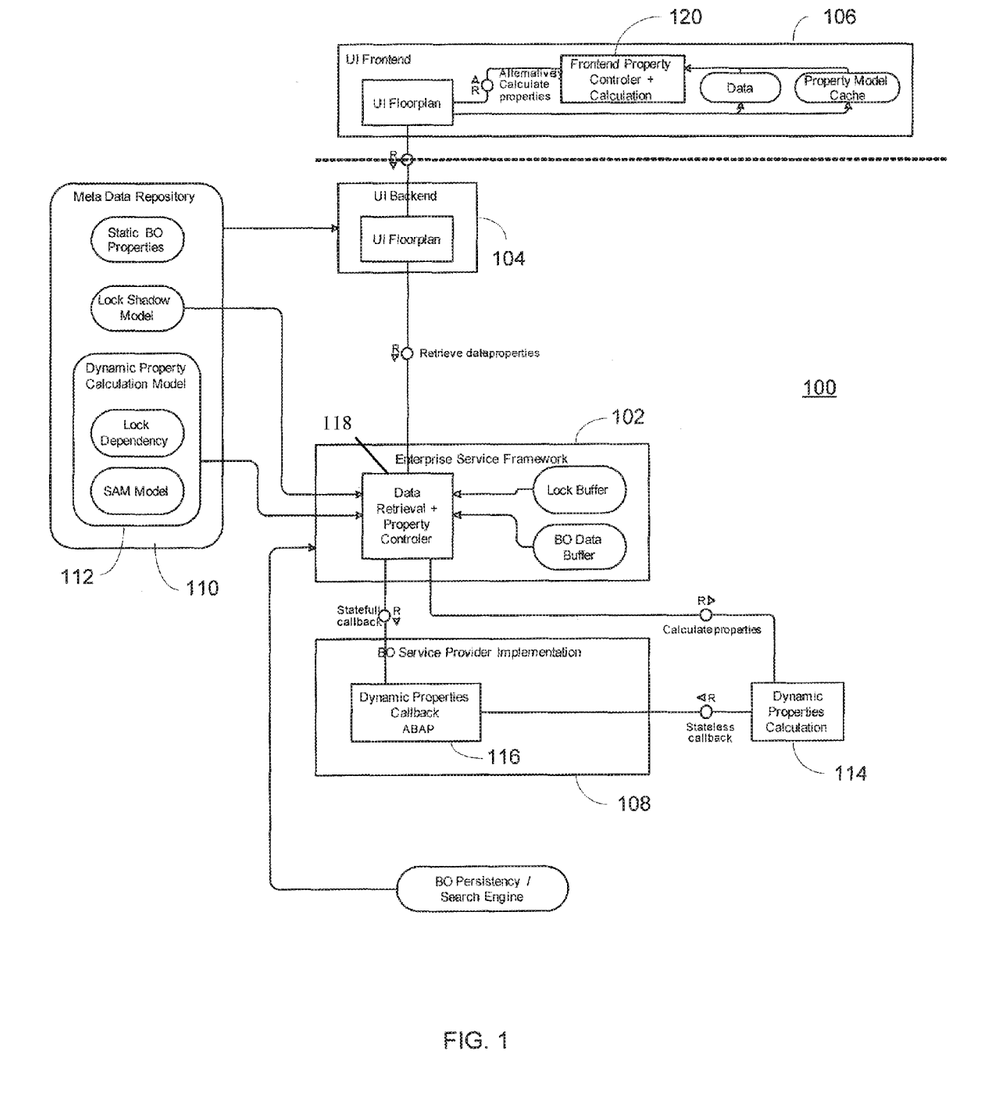
FIG. 1 illustrates a block diagram of an enterprise service system that includes an enterprise service framework that supports a user interface framework.

Turning now to FIG. 1, there is shown a block diagram of an enterprise service system 100 that includes an enterprise service framework 102 that supports a user interface (UI) framework having a UI backend 104 and a UI frontend 106. The UI frontend 106 generates a user UI for a business services application implemented by a business object (BO) service provider 108 and executed by the enterprise service framework 102.

Lock behavior and dynamic properties are modeled in a metadata repository 110 and evaluated by a dynamic property calculation model module 112. Modeled properties are calculated and/or evaluated at different levels of the enterprise service system 100. For instance, in one implementation, the modeled properties can be calculated by a dynamic properties calculation module 114 running between the enterprise service framework 102 and the BO service provider 108. In such an implementation, calculated dynamic properties are provided by the dynamic properties calculation module 114 to a property controller 118 of the enterprise service framework 102. Callbacks foreseen as "exits" for cases too complex to model, or which have not yet been modeled, are modeled by a dynamic properties callback module 116 that provides stateless callbacks for the calculated dynamic properties from the dynamic properties calculation module 114, and provides the dynamic properties as statefull callbacks.

In another implementation, the modeled properties can be calculated by a frontend property controller and calculator 120 in the UI frontend 106. In either implementation, the enterprise service framework 102 or the UI frontend 106 fetches not only data requested by the UI based on a UI "floorplan" or graphical layout, but also data required to calculate the properties. Also in either implementation, the properties calculation is separated from the BO service provider 108, in contrast to conventional techniques.

Modeling the properties as data fields allows use of the transformation logic (transformation rules) available for data fields in a controller infrastructure. That is, reusable transformation rules can be used by an UI developer to adjust or fix the property calculation based on the data of the business documents, user settings, and system fields. By binding the transformation rules to data and system fields, dependencies of the properties also become transparent (such as for generating a "where-used" list).

Property calculations can also be easily shifted from one framework/execution layer to another. For example, all UI data including properties can be retrieved either from the BO service provider or another service such as a search engine or an in-memory application suite, such as NewDB provided by SAP AG of Walldorf Germany. The shift is transparent for the service consumer (i.e. the user interface). This allows for fully exploiting the advantages of an execution on another layer. Also, by modeling the properties, a load balancing to execute on different layers can be supported.

Figure 2:
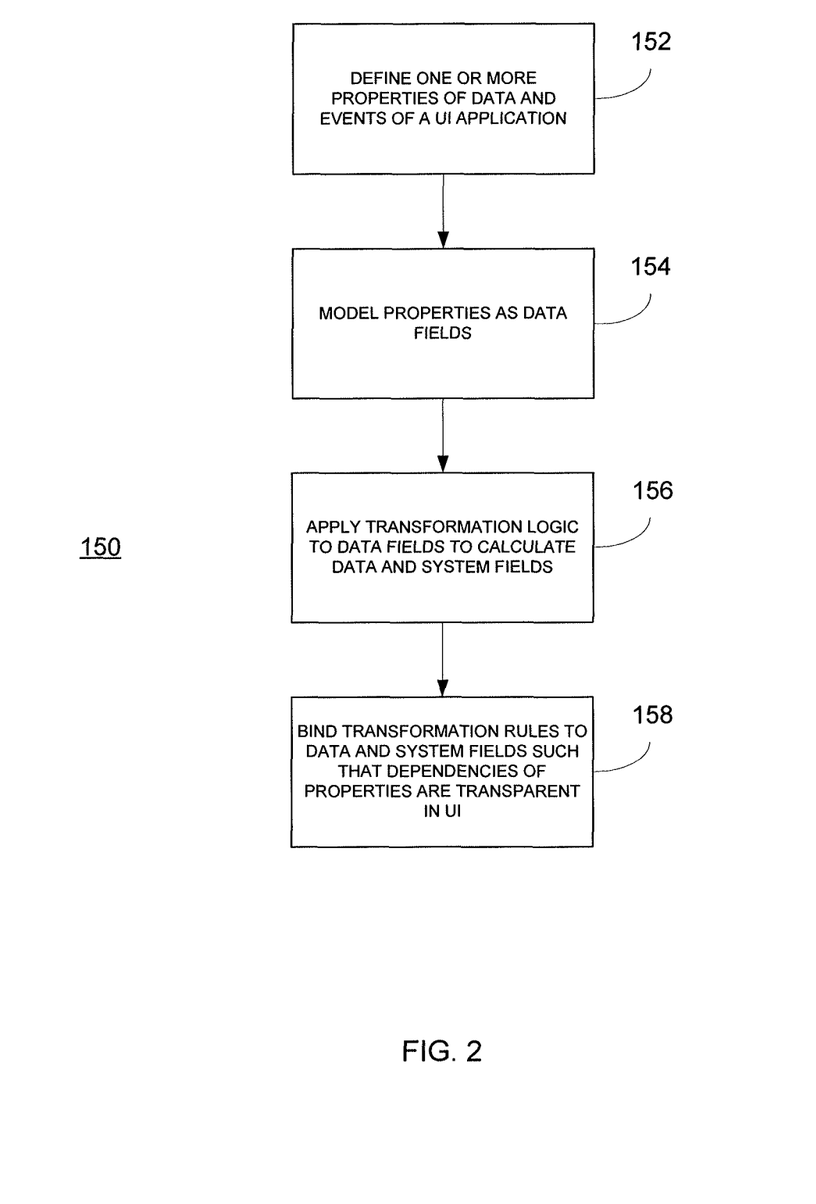
FIG. 2 is a flowchart of a method for modeling properties of data and events as transformations of document data and system values.

FIG. 2 is a flowchart of a method 150 for modeling properties of data and events as transformations of document data and system values. At 152, one or more properties of data and events of a UI application are defined. At 154, the properties are modeled as data fields of the UI application, as described further above. At 156, transformation logic is applied to the data fields to calculate data and system values for documents and system fields of the UI. At 158, transformation rules are bound to the data and system fields such that dependencies of properties are transparent in the UI.

The system and method described herein provides increasing modeling in the property calculation by using central transformation rules and bind them only in the UI model. The system and method also provides transparency of dependencies of properties on data values of the underlying business documents, user settings, and/or system fields like the current date. This enables establishment of a "where-used" list that may be required, for example, in case of changes. The system and method further allows central framework optimizations by making the calculation and dependencies transparent. Finally, there is no necessity to maintain two channels for data and properties, as they are basically handled identically in the layers retrieving and/or computing them.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
   defining, using one or more data processors of an enterprise service framework executing a business application that generates a user interface displayed on a user interface frontend system, one or more properties of data and events related to the business application;
   wherein the user interface is generated based on a user interface graphical layout and data required for calculation and evaluation of the one or more properties of data and events related to the business application,
   wherein the enterprise service framework supports a user interface framework comprising the user interface frontend system connected to a user interface backend system, and wherein the business application is implemented by a business object service provider and executed by the enterprise service framework, the user interface backend system hosts the business application, the user interface backend system being further connected to the enterprise service framework and retrieving the one or more properties of data and events related to the business application;

modeling, using the one or more data processors, each of the one or more properties of data and events as a data field of the business application, the modeled properties of data and events being calculated and evaluated using a dynamic properties calculator of the enterprise service framework, wherein the dynamic properties calculator is separate from the business object service provider;

accessing, by the one or more data processors, a set of transformation logic representing data transformation rules for each of the data fields of the business application; and applying, by the one or more data processors, the transformation rules to the data fields of the business application in response to a request by the user interface framework, the transformation rules being applied to the data fields that represent the one or more properties.

2. The method in accordance with claim 1, wherein applying the transformation rules to the data fields of the user interface further includes defining dependencies among the one or more properties.

3. The method in accordance with claim 1, wherein the business application includes a user interface that displays the application of the transformation rules.

4. The method in accordance with claim 1, further comprising retrieving the one or more properties of data and events related to the business application from the business object service provider.

5. The method in accordance with claim 1, further comprising retrieving the one or more properties of data and events related to the business application from a database shared with other business applications.

6. A system comprising:
a user interface frontend system that displays a user interface for a business application, wherein the business application is implemented by a business object service provider and executed by an enterprise service framework, the enterprise service framework supports a user interface framework comprising the user interface frontend system, the business application generates the user interface based on a user interface graphical layout and data required for calculation and evaluation of properties of data and events of the business application;

a user interface backend system comprising one or more hardware processors connected to the user interface frontend system, the user interface backend system hosting the business application and retrieving the one or more properties of data and events related to the business application;

the enterprise service framework comprising one or more hardware processors connected to the user interface backend system, the enterprise service framework executes the business application, defines one or more properties of the data and events of the business application, models each of the one or more properties as a data field of the business application, comprises a dynamic properties calculator being separate from the business object service provider and that includes one or more hardware processors to calculate and evaluate the modeled properties of data and events of the business application, and accesses a set of transformation logic representing data transformation rules for each of the data fields of the business application, applies the transformation rules to the data fields that represent the one or more properties in response to a request by the user interface framework.

7. The system in accordance with claim 6, wherein dynamic properties calculator further defines dependencies among the one or more properties using the transformation logic.

8. The system in accordance with claim 6, wherein the business application includes a user interface that displays the application of the transformation rules.

9. The system in accordance with claim 6, wherein the user interface backend system retrieves the one or more properties of data and events related to the business application from a business object service provider.

10. The system in accordance with claim 6, wherein the user interface backend system retrieves the one or more properties of data and events related to the business application from a database shared with other business applications.

11. A computer-implemented method comprising:
retrieving, using one or more data processors of an enterprise service framework executing a business application that generates a user interface displayed on a user interface frontend system, one or more properties of data and/or events related to the business application, wherein the user interface is generated based on a user interface graphical layout and data required for calculation and evaluation of the one or more properties of data and events related to the business application, wherein the enterprise service framework supports a user interface framework comprising the user interface frontend system connected to a user interface backend system, and wherein the business application is implemented by a business object service provider and executed by the enterprise service framework, the user interface backend system hosts the business application, the user interface backend system being further connected to the enterprise service framework and retrieving the one or more properties of data and events related to the business application;

modeling, using the one or more data processors, each of the one or more properties of data and events as a data field of the business application, the modeled properties of data and events being calculated and evaluated using a dynamic properties calculator of the enterprise service framework, wherein the dynamic properties calculator is separate from the business object service provider;

accessing, by the one or more data processors, a set of transformation logic representing data transformation rules for each of the data fields of the business application; and applying, by the one or more data processors, the transformation rules to the data fields of the business application in response to a request by the user interface framework, the transformation rules being applied to the data fields that represent the one or more properties.

12. The method in accordance with claim 11, wherein applying the transformation rules to the data fields of the user interface further includes defining dependencies among the one or more properties.

13. The method in accordance with claim 11, wherein the business application includes a user interface that displays the application of the transformation rules.

14. The method in accordance with claim 11, further comprising retrieving the one or more properties of data and events related to the business application from the business object service provider.

15. The method in accordance with claim 11, further comprising retrieving the one or more properties of data and events related to the business application from a database shared with other business applications.

\* \* \* \* \*